United States Patent
Lindner et al.

(10) Patent No.: US 9,714,693 B2
(45) Date of Patent: Jul. 25, 2017

(54) TENSIONING RAIL WITH RESILIENT PRESS-ON REGION

(71) Applicant: IWIS MOTORSYSTEME GmbH & Co. KG, München (DE)

(72) Inventors: Ulrich Lindner, München (DE); Yannick Guyot, München (DE)

(73) Assignee: IWIS MOTORSYSTEME GMBH & CO. KG, München (DE)

( * ) Notice: Subject to any disclaimer, the term of this patent is extended or adjusted under 35 U.S.C. 154(b) by 43 days.

(21) Appl. No.: 14/765,555

(22) PCT Filed: Feb. 14, 2014

(86) PCT No.: PCT/EP2014/000418
§ 371 (c)(1),
(2) Date: Aug. 3, 2015

(87) PCT Pub. No.: WO2014/139628
PCT Pub. Date: Sep. 18, 2014

(65) Prior Publication Data
US 2015/0369345 A1    Dec. 24, 2015

(30) Foreign Application Priority Data
Mar. 14, 2013  (DE) ........................ 10 2013 004 456

(51) Int. Cl.
*F16H 7/08* (2006.01)
*F16H 7/06* (2006.01)
*F16H 7/18* (2006.01)

(52) U.S. Cl.
CPC ............... *F16H 7/08* (2013.01); *F16H 7/06* (2013.01); *F16H 2007/0872* (2013.01); *F16H 2007/0893* (2013.01); *F16H 2007/185* (2013.01)

(58) Field of Classification Search
CPC ...... F16H 2007/0872; F16H 7/18; F16H 7/08; F16H 2007/0804; F16H 2007/0893
(Continued)

(56) References Cited

U.S. PATENT DOCUMENTS 4,826,468 A * 5/1989 Friedrichs ................. F16H 7/08
474/101
4,921,472 A * 5/1990 Young ....................... F16H 7/08
474/111
(Continued)

FOREIGN PATENT DOCUMENTS

DE            10161685 A1   9/2002
DE      10 2010 051950 A1   5/2012
(Continued)

*Primary Examiner* — Henry Liu
(74) *Attorney, Agent, or Firm* — Baker and Hostetler LLP

(57) ABSTRACT

A tensioning rail for an endless drive, in particular a timing chain drive of an internal combustion engine, comprises a sliding lining body and a reinforcement body inserted in the sliding lining body and connected thereto by a detent connection, the sliding lining body comprising a slide rail for contact with an endless drive and a press-on region for the tensioning piston of a tensioning device. The tensioning rail is characterized in that the press-on region is arranged in a resiliently movable fashion on the slide rail and comprises a detent device as a constituent part of the detent connection such that the detent device is adapted to be locked due to the resilient movement of the press-on region. An endless drive having a tensioning rail of the type disclosed is also provided.

14 Claims, 6 Drawing Sheets

(58) Field of Classification Search
USPC .......................................................... 474/111
See application file for complete search history.

(56) References Cited

U.S. PATENT DOCUMENTS

| | | | | |
|---|---|---|---|---|
| 5,055,088 A * | 10/1991 | Cradduck | ................. | F16H 7/08 474/111 |
| 5,711,732 A * | 1/1998 | Ferenc | ..................... | F16H 7/08 474/101 |
| 5,782,625 A * | 7/1998 | Young | ....................... | F16H 7/08 474/110 |
| 6,086,498 A * | 7/2000 | Hashimoto | ............... | F16H 7/08 474/111 |
| 6,572,502 B1 * | 6/2003 | Young | ....................... | F16H 7/08 474/111 |
| 6,612,953 B2 * | 9/2003 | Tada | ..................... | F16H 7/0831 474/111 |
| 6,623,391 B2 * | 9/2003 | Young | ....................... | F16H 7/08 474/101 |
| 6,645,102 B2 * | 11/2003 | Kumakura | ................ | F16H 7/18 474/111 |
| 6,692,390 B2 * | 2/2004 | Ono | .......................... | F16H 7/18 474/111 |
| 6,796,917 B2 * | 9/2004 | Konno | ...................... | F16H 7/18 474/111 |
| 6,835,149 B2 * | 12/2004 | Konno | ...................... | F16H 7/08 474/111 |
| 6,843,742 B2 * | 1/2005 | Konno | ...................... | F16H 7/18 403/13 |
| 6,852,051 B2 * | 2/2005 | Konno | ...................... | F16H 7/18 474/111 |
| 6,913,552 B2 * | 7/2005 | Young | ....................... | F16H 7/18 474/111 |
| 6,969,331 B2 * | 11/2005 | Konno | ...................... | F16H 7/18 474/111 |
| 7,074,146 B2 * | 7/2006 | Fujikubo | ................ | F16H 7/0848 474/111 |
| 7,252,609 B2 * | 8/2007 | Hashimoto | ............... | F16H 7/18 474/111 |
| 8,617,012 B2 * | 12/2013 | Young | ....................... | F16H 7/08 474/111 |
| 8,888,628 B2 * | 11/2014 | Konno | ...................... | F16H 7/18 474/111 |
| 8,992,358 B2 * | 3/2015 | Adams | ................. | B21D 26/033 474/111 |
| 2002/0045503 A1 * | 4/2002 | Young | ....................... | F16H 7/08 474/111 |
| 2002/0077204 A1 * | 6/2002 | Kumakura | ................ | F16H 7/18 474/140 |
| 2002/0115511 A1 * | 8/2002 | Tada | ..................... | F16H 7/0831 474/111 |
| 2002/0132688 A1 * | 9/2002 | Ono | .......................... | F16H 7/18 474/111 |
| 2002/0142872 A1 * | 10/2002 | Tada | ......................... | F16H 7/18 474/111 |
| 2003/0040385 A1 * | 2/2003 | Konno | ...................... | F16H 7/18 474/111 |
| 2003/0139236 A1 * | 7/2003 | Konno | ...................... | F16H 7/18 474/111 |
| 2003/0139237 A1 * | 7/2003 | Konno | ...................... | F16H 7/18 474/111 |
| 2003/0144100 A1 * | 7/2003 | Konno | ...................... | F16H 7/18 474/111 |
| 2003/0144101 A1 * | 7/2003 | Konno | ...................... | F16H 7/08 474/111 |
| 2004/0132569 A1 * | 7/2004 | Fujikubo | ............... | F16H 7/0848 474/111 |
| 2005/0026730 A1 * | 2/2005 | Hashimoto | ............... | F16H 7/18 474/111 |
| 2005/0277506 A1 * | 12/2005 | Konno | ...................... | F16H 7/18 474/111 |
| 2006/0025256 A1 * | 2/2006 | Wake | ....................... | F16H 7/08 474/111 |
| 2006/0223661 A1 * | 10/2006 | Haesloop | ............. | F16H 7/0831 474/111 |
| 2007/0037647 A1 * | 2/2007 | Markley | ................... | F16H 7/18 474/111 |
| 2008/0153643 A1 * | 6/2008 | Franke | ..................... | F16H 7/18 474/111 |
| 2010/0210384 A1 * | 8/2010 | Young | ....................... | F16H 7/08 474/111 |
| 2011/0077114 A1 * | 3/2011 | Markley | ................... | F01L 1/02 474/111 |
| 2012/0035010 A1 * | 2/2012 | Young | ....................... | F16H 7/08 474/111 |
| 2014/0057749 A1 * | 2/2014 | Konno | ...................... | F16H 7/18 474/111 |
| 2014/0171244 A1 * | 6/2014 | Hartmann | ................. | F16H 7/08 474/111 |
| 2015/0024889 A1 * | 1/2015 | Konno | ...................... | F16H 7/18 474/111 |

FOREIGN PATENT DOCUMENTS

| | | |
|---|---|---|
| EP | 1 245 864 A2 | 10/2002 |
| EP | 1 286 083 A2 | 2/2003 |
| EP | 1 300 607 A2 | 4/2003 |
| JP | 2003-222210 A | 8/2003 |

* cited by examiner

TENSIONING RAIL WITH RESILIENT PRESS-ON REGION

CROSS-REFERENCE TO RELATED APPLICATIONS

This application is a National Stage of International patent application PCT/EP2014/000418, filed on Feb. 14, 2014, which claims priority to foreign German patent application No. DE 102013004456.1, filed on Mar. 14, 2013, the disclosures of which are incorporated by reference in their entirety.

FIELD OF THE INVENTION

The present invention relates to a tensioning rail with a sliding lining body and a reinforcement body inserted in said sliding lining body and connected thereto by means of a detent connection, said sliding lining body comprising a slide rail for contact with an endless drive means and a press-on region for the tensioning piston of a tensioning device.

BACKGROUND

Such a tensioning rail is known e.g. from EP 1286083 A2. The sliding lining body is an injection molded part produced by means of injection molding and having, with the exception of the pivoting region and the press-on region, a substantially uniform thickness. On the back of the slide rail, a groove is provided, which has inserted therein a reinforcement metal sheet in an upright position. To this end, the groove extends throughout the whole pivoting area, whereas in the press-on region the groove is closed in a channel-like manner so that the reinforcement metal sheet is inserted in said channel. Both the pivoting area and the press-on region of the sliding lining body have provided thereon resilient detent tongues, which lockingly engage associated windows in the reinforcement metal sheet. The press-on region is configured as a truss structure, trussed beams supporting the press-on surface at the ends and at the center thereof. The detent tongue is arranged in one of the windows of the truss structure.

Such tensioning rails are used e.g. in highly dynamic timing chain drives for internal combustion engines. To this end, they are pivotably secured to the engine block and are pressed into contact with the timing chain by means of a chain tensioner. The timing chain then slides along the slide rail which is arcuate in shape. The known tensioning rail provides a comparatively stable structural design in combination with light weight. The reinforcement metal sheet makes the tensioning rail sufficiently stable and solid, whereas the sliding lining body provides the properties required for allowing the timing chain to slide therealong. Moreover, also the press-on surface of the tensioning piston is prevented from damage, since the tensioning piston acts on the sliding lining body and not on the reinforcement metal sheet. On the whole, such a tensioning rail proved to be useful; however, failure of the detent connections occurs every now and then, since, for system inherent reasons, the plastic material used is selected primarily under the aspect of its sliding properties.

Additional tensioning rails with detent connections are also known from EP 1245864 A2 and from DE 10161685 A1.

SUMMARY OF THE INVENTION

In the case of a tensioning rail according to the preamble of claim 1, the object is achieved, according to the present invention, in that the press-on region is arranged in a resiliently movable fashion on the slide rail and comprises a detent device as a constituent part of the detent connection such that the detent device is adapted to be locked due to the resilient movement of the press-on region.

This allows a comparatively rigid structural design of the detent device, whereas the resilient properties are provided by the structure of the press-on region. This means that the actual spring element can, in principle, consist of the entire press-on region, so that an adequately stable structural design of this element, which imparts the resilient properties to the detent device, is achieved. A failure of the detent connection is almost impossible, since a much larger amount of plastic material is available for configuring the resilient structure. In contrast to this, EP 1286083 A2 uses a stable truss structure, which prevents such a resilient movement of the press-on region, so that the detent tongue itself must have resilient properties. Resiliently movable press-on regions are not known from EP 1245864 A2 and DE 1016185 A1 either.

According to a further embodiment, the press-on region may include a resiliently movable middle portion after the fashion of a bridge, said middle portion having the detent device arranged thereon. The middle portion, when under load, can move upwards and downwards so as to provide at least the movement required for the locking process. A structural design which is here particularly advantageous is a design after the fashion of an arched bridge, which will impart additional stability to the press-on region in the pressure direction of the tensioning piston of a tensioning device, whereas, in the opposite direction, which is normally used for the locking movement, the press-on region is configured such that it exhibits higher resilience.

Hence, one variant is also configured such that the press-on region comprises first and second areas fixedly connected to the rest of the sliding lining body, and the intermediate, resiliently movable middle portion that is only connected to the rest of the sliding lining body exclusively by means of said first and second areas.

According to another embodiment, an insertion channel and the detent device are provided below the middle portion of the press-on region, the reinforcement body being inserted in said insertion channel and locked with said detent device. Accordingly, the reinforcement body is inserted in the insertion channel. Here, a great variety of design possibilities are available, which utilize this insertion movement so as to cause a displacement of the detent device against the spring force of the press-on region. In particular, the use of a ramp is advisable, whereby the detent device will be moved against the spring action of the press-on region and then lock in position.

In order to avoid a weakening of the sliding lining body and of the reinforcement body, a variant is advisable, in the case of which the detent device on the press-on region is a protruding detent projection, which is in locking engagement with an adapted undercut on the reinforcement body.

In order to impart to the press-on region sufficient lateral stability for reliably guiding the reinforcement body, the middle portion of the press-on region may have downwardly projecting side elements arranged laterally on the reinforcement body; they extend so to speak over said reinforcement body from the side. The side elements are preferably arranged at a certain distance from the slide rail so as not to limit the resilience of the press-on region.

Preferably, the sliding lining body may be made of plastic material, whereas the reinforcement body is made of metal, preferably of steel. This provides the possibility of using a simple sheet metal part as a reinforcement body, which is produced by blanking, whereas the sliding lining body can assume a somewhat more complicated shape by means of injection molding. Especially an upright mode of arrangement of the reinforcement body on the back and perpendicular to the slide rail imparts to the tensioning rail in its entirety a very good bending stiffness for reliably guiding and tensioning an endless drive means.

According to an advantageous embodiment, the sliding lining body including the press-on region may be an integrally formed plastic component. The sliding lining body is thus provided with a coherent solid structure, which is not weakened by any connection points.

In order to make the pivot connection of the tensioning rail sufficiently stable, a pivot opening of the tensioning rail may be defined by the reinforcement body.

In order to make the reinforcement body sufficiently stable in the area of the pivot opening, block supports are provided on the sliding lining body on both sides thereof below the pivot opening according to a variant, said block supports defining between them an accommodation groove having the reinforcement body arranged therein. Thus, the sliding lining body and the reinforcement body are, in a stable manner, prevented from laterally moving relative to each other in this area. In addition, the block supports serve to prevent tilting of the rail, which would otherwise rest on a pin only via the reinforcement body. The block supports may be configured such that a relative movement resulting from different thermal expansions is allowed, since the connection chosen at the press-on region is rather a connection which will preferably not allow expansion compensation in the longitudinal direction.

According to an advantageous embodiment, the reinforcement body has an extension on its end located close to the pivot opening, said extension being in locking engagement with the sliding lining body through an additional detent connection. The pivot opening and the press-on region are, for system inherent reasons, arranged on the tensioning rail at a comparatively large distance from one another, so that also the detent connections associated therewith are spaced apart at a comparatively large distance and secure the reinforcement body effectively against disconnection from the sliding lining body. The detent connection in the vicinity of the pivot opening may especially serve to hold the reinforcement body reliably in the accommodation groove between the block supports.

According to another embodiment, a further improvement of the connection between the reinforcement body and the sliding lining body is achieved in that the reinforcement body defines an insertion end on an end located remote from the pivot opening, said insertion end being inserted in an accommodation pocket on the sliding lining body. This has the effect that the reinforcement body is axially fixed in at least one direction, whereas the other axial fixing can be established by a detent connection on the press-on region.

According to the present invention, the term "resiliently movable" describes not only an elastic deformation in response to conventional loads but also a resilience movement that actually takes place during the locking process in the form of a locking movement. This movement is normally directed perpendicular to the slide rail. Preferably, the press-on region may be resiliently configured such that it provides a locking movement of at least 1 mm for the detent device. The sliding lining body need not necessarily be configured as a one-piece component, in particular the sliding surface may be defined by an element that has been optimized once more with respect to its sliding properties.

In addition, the present invention relates to an endless drive, in particular a timing chain drive of an internal combustion engine, comprising a drive gear, at least one driven gear, an endless drive means, such as a chain or a belt, coupling the drive gear and the at least one driven gear, and a tensioning rail according to one of the claims 1 to 13, tensioning the endless drive means. The tensioning rail in question provides an embodiment of a detent connection that satisfies the extreme demands of a highly dynamic endless drive. Due to the fact that the spring for the detent device can be configured as a stable element, a failure of the detent device is almost impossible. Especially in the case of an embodiment where the press-on region must move substantially perpendicularly away from the slide rail for the purpose of locking, the detent connection, when used later on, will additionally be locked due to the pressing on of a tensioning piston of a tensioning device, since, as long as the tensioning piston is pressed on, there will be no risk of unlocking as a result of dynamic processes.

BRIEF DESCRIPTION OF THE DRAWINGS

In the following, an embodiment of the present invention will be explained in more detail making reference to the drawings, in which.

DETAILED DESCRIPTION

Figure 1:
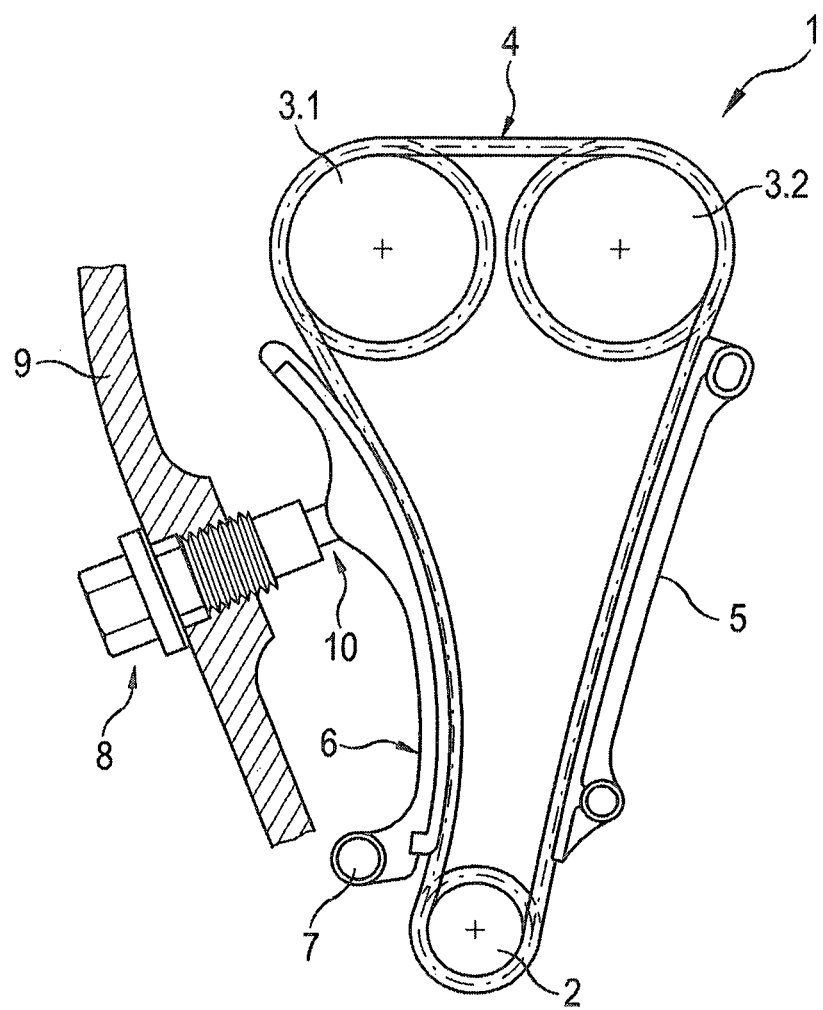
FIG. 1 shows a timing chain drive in a schematic front view.
Figure 2:
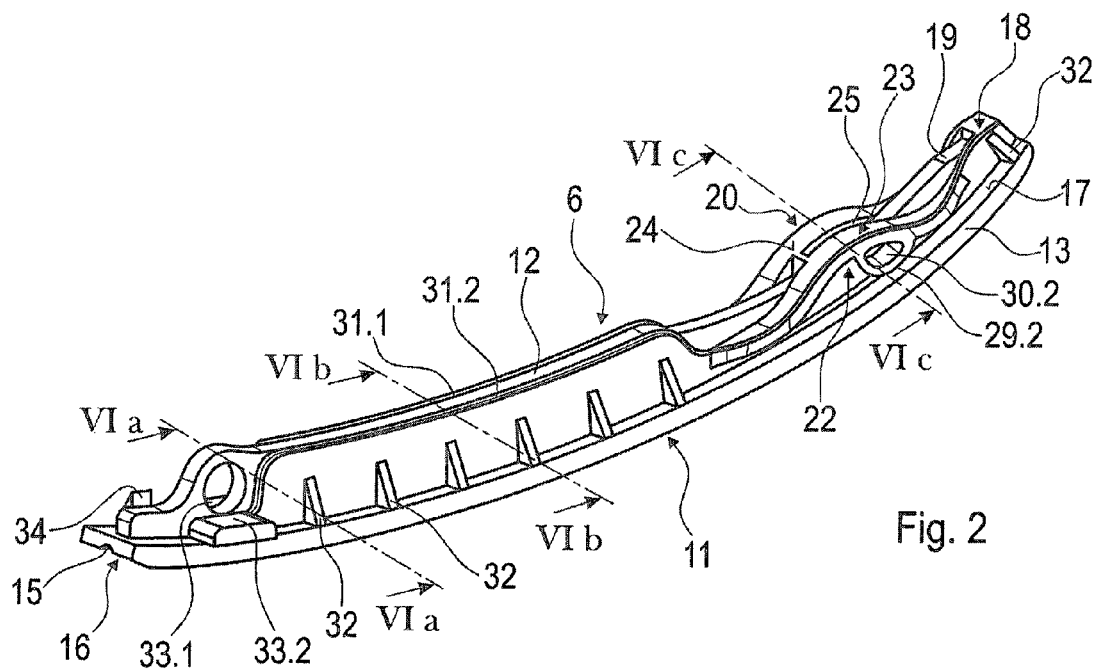
FIG. 2 shows a tensioning rail according to the present invention in a perspective view.
Figure 3:
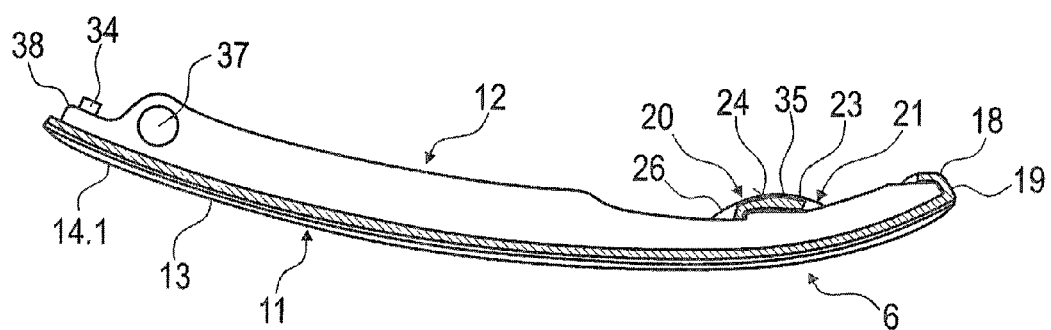
FIG. 3 shows the tensioning rail according to FIG. 2 in a full section view.
Figure 4:
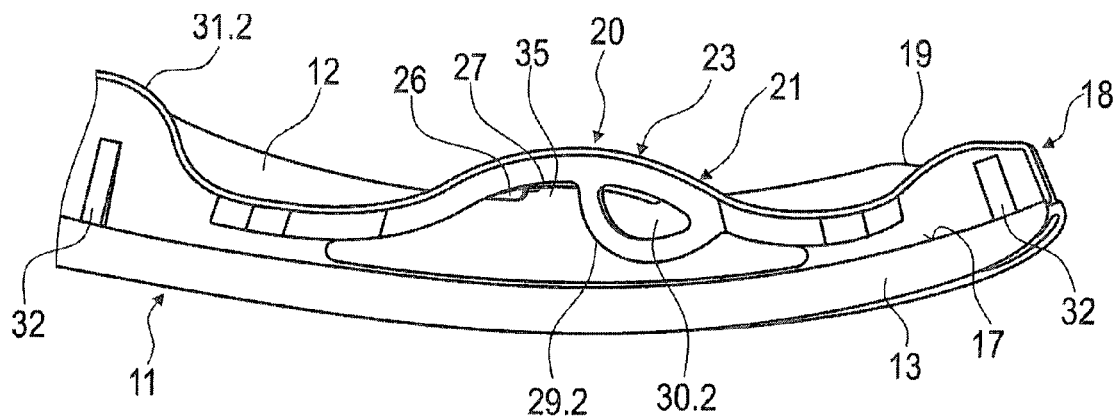
FIG. 4 shows the press-on portion of the tensioning rail in an enlarged perspective side view.
Figure 5:
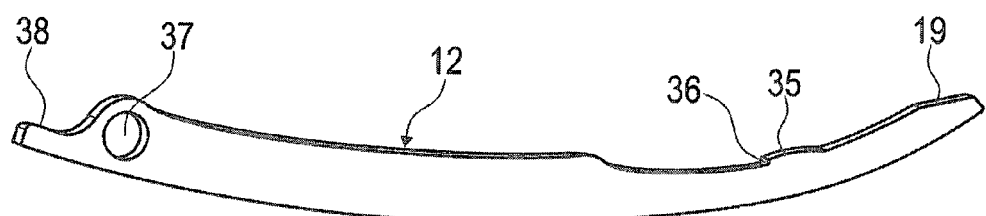
FIG. 5 shows the reinforcement body according to FIG. 2 in a perspective side view.
Figure 6A:
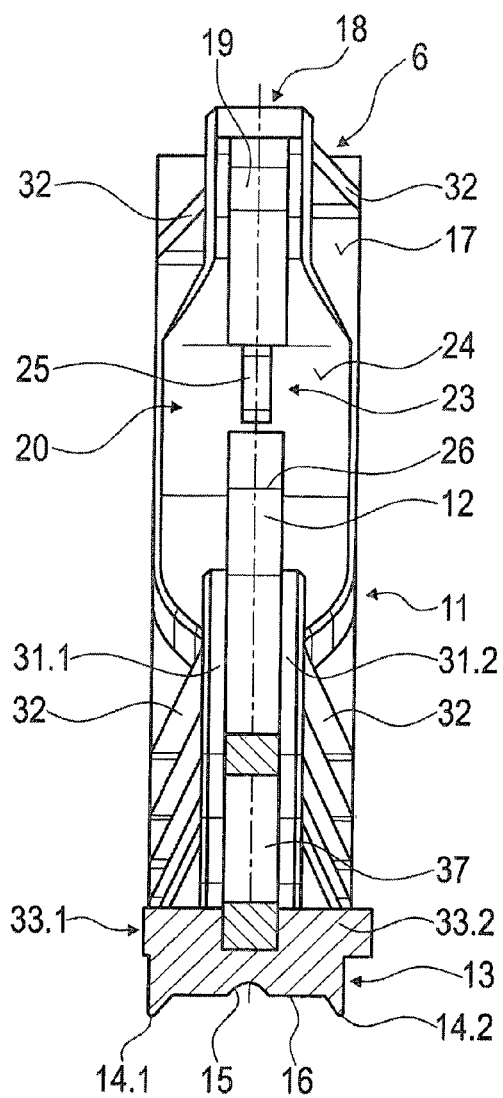
FIG. 6a shows a sectional view of the tensioning rail according to FIG. 2 along line V1a-V1a, FIG. 6b shows a sectional view of the tensioning rail according to FIG. 2 along line V1b-V1b.
Figure 6B:
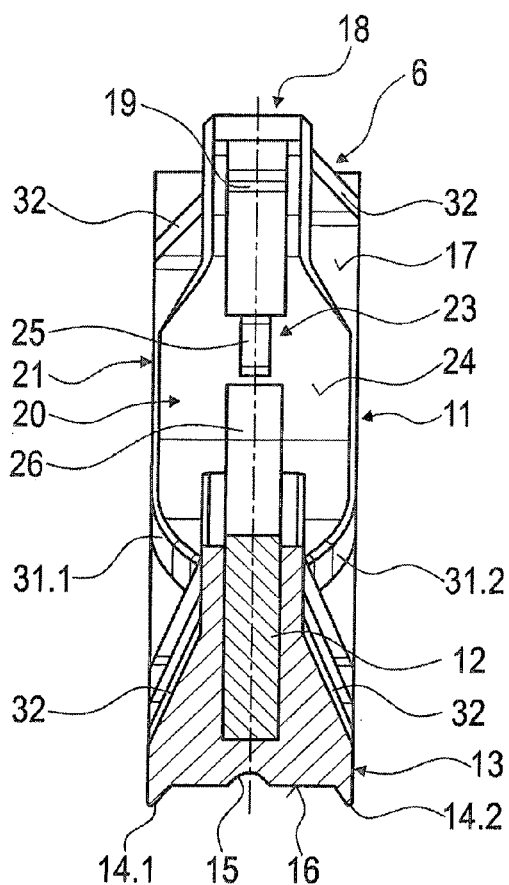
FIG. 6c shows a sectional view of the tensioning rail according to FIG. 2 along line V1c-V1c.
Figure 6C:
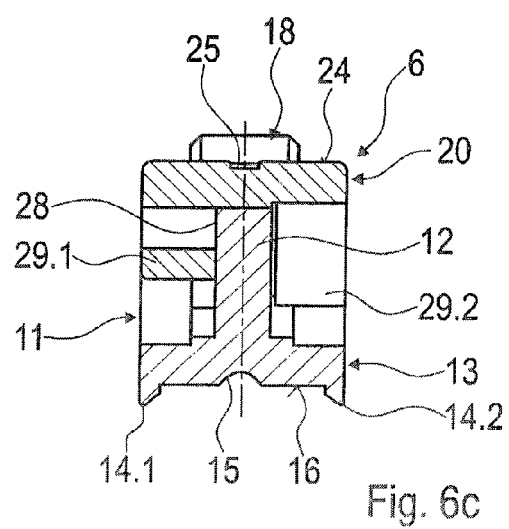
Figure 7:
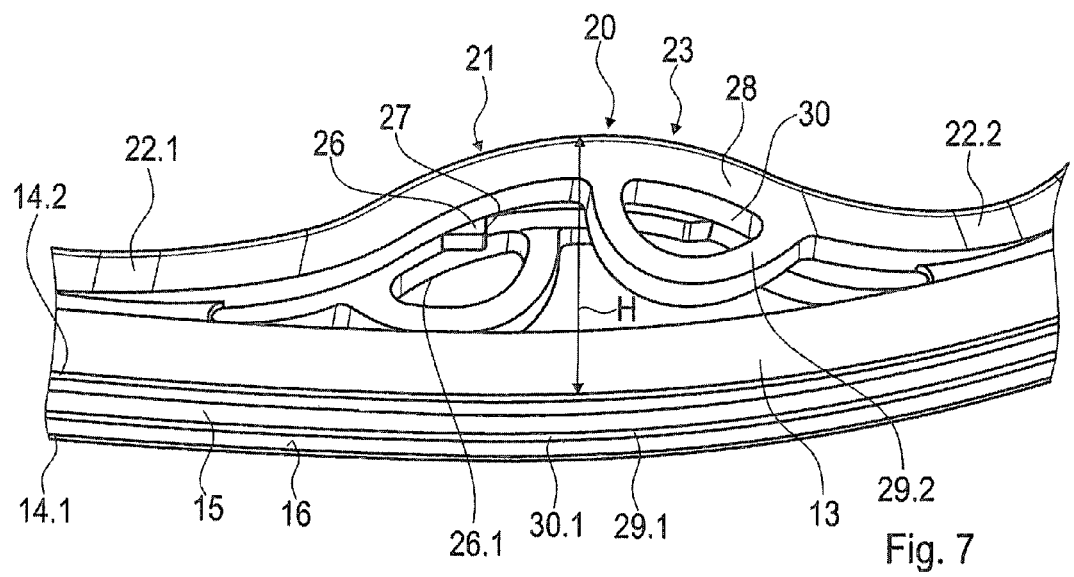
FIG. 7 shows the press-on region of the tensioning rail in a perspective bottom view.
Figure 8:
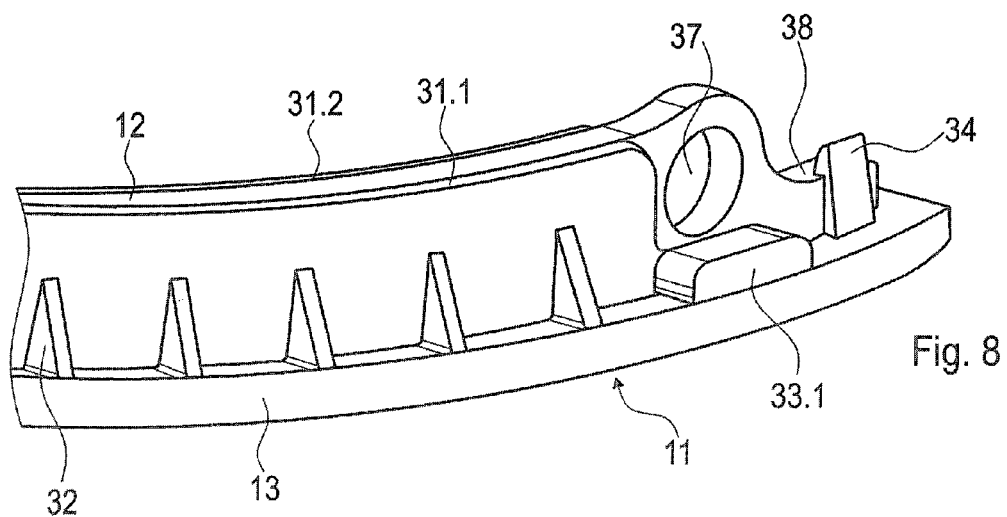
FIG. 8 shows a perspective view of the pivot area of the tensioning rail and FIGS. 9a-9c show a sequence of mounting steps for mounting the reinforcement body on the sliding lining body.

FIG. 1 shows schematically a timing chain drive 1 comprising substantially a crankshaft sprocket 2, two upper camshaft sprockets 3.1 and 3.2, an endless timing chain 4 wrapped around the sprockets 2, 3.1, 3.2, and a guide rail 5 as well as a tensioning rail 6. The tensioning rail 6 is pivotably supported at its pivot point 7 and, by means of a chain tensioner 8 arranged in part of the engine case 9, it is pressed against the timing chain 4 in that the tensioning piston 10 of the chain tensioner 8 applies pressure to the back of the tensioning rail 6.

The guide rail 5 is associated with the tight span of the timing chain drive 1 and, through the tensioning rail 6, with the slack span. Such a timing chain drive 1 is a highly dynamic device, which must cope with high speeds on the one hand and resist the varying dynamic loads on the other. In so doing, the component parts reach their load limits and, consequently, it is important to take a great variety of measures for damping or suppressing vibrations within this system. In addition, it is important to provide sufficient stability, especially with respect to the tensioning rail 6, which should nevertheless be configured as a lightweight component. A failure of components within a timing chain drive 1 will normally cause damage to an internal combustion engine associated therewith.

FIGS. 2 to 8 and the following figures now show a tensioning rail 6 of the type adapted for use in a timing chain drive according to FIG. 1.

The tensioning rail 6 essentially consists of a sliding lining body 11 and a reinforcement body 12 connected to the latter. The reinforcement body 12 is a metal carrier produced by blanking, which has a slightly curved shape and a uniform thickness.

The sliding lining body 11 is a plastic component produced by injection molding and configured as a one-piece component. A suitable plastic material is e.g. a polyamide, in particular PA66. The reinforcement body 12 is made of a steel material.

On its side abutting on the timing chain 4, the sliding lining body 11 comprises a continuous slide rail 13 with chamfered sidewalls 14.1 and 14.2 and with a central lubrication groove 15 of approximately semicircular cross-section. The slide rail 13 provides between the sidewalls 14.1 and 14.2 a slide surface 16, which is in direct contact with the timing chain 4.

The back 17 of the slide rail 13 has provided thereon a great variety of formations along its length. In the front area, an accommodation pocket 18 is provided, which has inserted therein an insertion end 19 of the reinforcement body 12. This accommodation pocket 18 is followed by a press-on region 20 in the form of an arched bridge. That is to say, the middle portion 21 of this press-on region 20 is not connected to the slide rail 13, whereas the two end portions 22.1 and 22.2 are connected to the back 17 of the slide rail 13. The end portion 22.2 defines, together with the accommodation pocket 18, sidewalls between which the reinforcement body 12 is arranged. The middle portion 21 includes a central portion 23 defining a closed press-on surface 24 with a central venting groove 25. The venting groove 25 is in alignment with a vent hole provided in the end face of the tensioning piston 10 of the chain tensioner 8. Outside the central portion 23, the middle portion 21 is, on both sides of said central portion 23, subdivided into two respective arches of this bridge construction, so that the reinforcement body 12 can be passed therebetween.

Hence, the middle portion 21 defines a sort of channel through which the reinforcement body 12 can be passed.

The side of the central portion 23 facing downwards includes a detent projection 26 on the side facing away from the accommodation pocket 18, said detent projection 26 including a downwardly directed guide surface 26.1, which is oriented approximately parallel to a tangent plane of the slide rail 13 extending on the same level, and a detent surface 27 defining an undercut and directed approximately towards the accommodation pocket 18. The detent projection 26 is followed by an arcuate ramp web 28, which ascends in the direction of the accommodation pocket 18 and projects into the channel.

On the lower side of the middle portion 21, side elements 29.1, 29.1 are provided on both sides of the central portion 23, said side elements being displaced relative to one another in the longitudinal direction of the tensioning rail 6 and having each a window 30. The longitudinal displacement of these side elements 29.1, 29.2 primarily originates from the manufacturing process, viz. injection molding, and a better demoldability. The tensioning rail 6 exhibits its maximum height H in its press-on region 20. The whole structure or structural design of the press-on region 20 has the effect that the detent projection 26, which is per se a rigid element, is resiliently movable.

The end portion 22.1 is followed by a groove section of the tensioning rail 6, said groove section comprising two parallel groove walls 31.1 and 31.2 and accommodating therebetween the associated section of the reinforcement body 12 such that the latter is substantially covered on its sides. For the purpose of reinforcement, lateral reinforcing ribs 32 are provided at predetermined intervals. Such reinforcing ribs 32 are also provided laterally on the accommodation pocket 18. These groove walls 31.1 and 31.2 are followed by block supports 33.1 and 33.2, which are arranged on both sides of the reinforcement body 12 and which slightly project beyond the slide rail 13 on the side and reinforce the sliding lining body 11 at this point. Also the block supports 33.1, 33.2 define a groove between them, in which the reinforcement body 12 is arranged.

At the rear end of the tensioning rail 6, which is the end located opposite the accommodation pocket 18, a resilient detent hook 34 is provided adjacent the reinforcement body 12 on one side thereof.

In spaced relationship with its chamfered insertion end 19, which is inserted in the complementarily shaped accommodation pocket 18, the reinforcement body 12 is provided with a detent web 35 defining a ramp ascending in an arcuate shape, the shape of said ramp being adapted to the ramp web 28 below the central portion 23. This detent web 35 has a detent surface 36 directed away from the insertion end 19 and cooperating with the detent surface 27 of the detent projection 26. Subsequently, the height of the reinforcement body 12 increases slightly and merges via a rounded step with the area enclosed by the groove walls 31.1 and 31.2. In the rear area, the reinforcement body 12 includes a pivot opening 37 arranged fully outside the groove walls 31.1 and 31.2 and for the most part fully outside the block supports 33. The area of the reinforcement body 12 surrounding the pivot opening 37 has arranged thereon an extension 38, which abuts on the back 17 of the slide rail 13 and the upper surface of which lockingly engages with the detent hook 34.

Hence, the sliding lining body 11 and the reinforcement body 12 have two spaced-apart detent connections, viz. on the press-on region 20 on the one hand and on the extension 38 close to the pivot opening 37 on the other. While the detent hook 34 mainly only prevents the reinforcement body 12 from lifting off from the sliding lining body 11, the detent projection 26 locks the reinforcement body 12 in the longitudinal direction, so that the latter cannot easily be removed from the channel. In the other longitudinal direction, a locking effect is produced by the accommodation pocket 18 in combination with the insertion end 19.

Figure 9A:
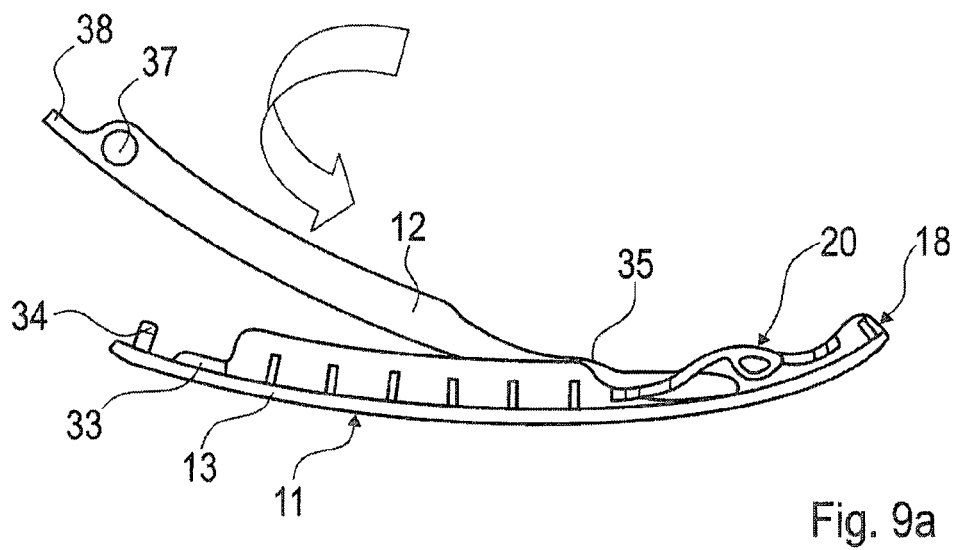
Figure 9B:
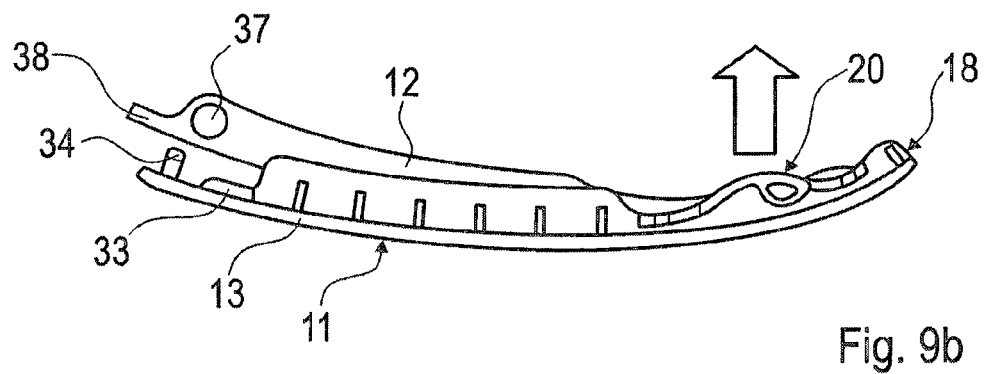
Figure 9C:
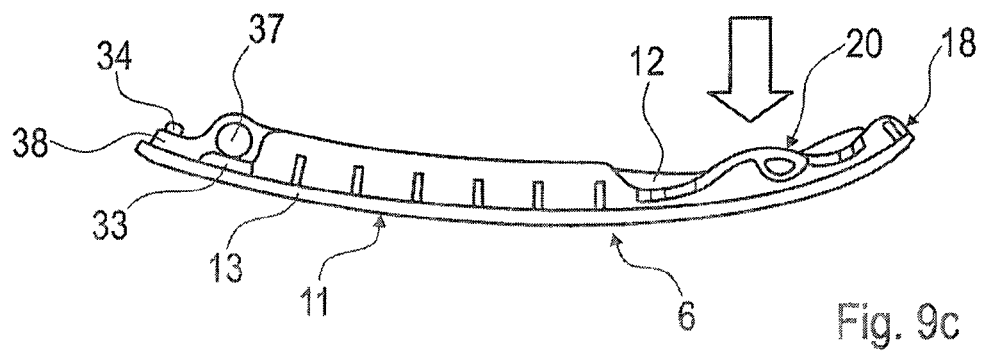

Especially with the aid of FIGS. 9a to 9c, the steps for mounting the sliding lining body 11 and the reinforcement body 12 are now explained in more detail. Making use of the insertion end 19, the reinforcement body 12 is threaded into the channel below the press-on region 20 and displaced in the direction of the accommodation pocket 18. In the course of this process, the detent web 35 comes into contact with the guide surface 26.1 of the detent projection 26. Due to the fact that the detent web 35 ascends in a ramplike manner, the whole press-on region 20 will be pushed upwards, when the reinforcement body is advanced still further. This is due to its resilient configuration in the form of a bridge. However, as soon as the detent projection 26 has slid over the detent web 35, the spring force created by the press-on region 20 causes the latter to snap downwards together with the detent projection 26, so that the detent surfaces 27 and 36 are positioned in opposed relationship with one another and the upper surface of the detent web 35 abuts on the lower surface of the ramp web 28. Locking engagement in this area has thus been accomplished. Simultaneously, however, also the upper surface of the extension 38 lockingly engages the downwardly directed detent surface of the detent hook 34. This has the effect that, subsequently, a reliable fastening of the sword-shaped reinforcement body 12 to the sliding lining body 11 is given.

In order to allow in particular the locking engagement on the press-on region 20, the latter must be configured in a resiliently movable fashion, i.e. the middle portion 21 is not connected to the slide rail 13. The press-on region 20 executes here a locking movement corresponding to at least 1 mm or at least 5% of the total height H of the tensioning rail 6 on the press-on region 20. The resultant detent device is extremely stable, since structures are employed for which a comparatively large amount of plastic material can be used. However, the movement (executed for the locking process) of the detent projection 26 away from the back 17 of the slide rail 13 is also advantageous insofar as the chain tensioner 8, when used later on, will press the press-on region 20 against the reinforcement body 12 by means of its tensioning piston 10, thus additionally preventing a release of the locking engagement between the detent projection 26 and the detent web 35. Most of the hitherto known detent connections resembled those used between the detent hook 34 and the extension 38, these kind of detent connections executing a locking movement transversely to the principal plane of the reinforcement body 12. The new kind of detent connection executes a movement along this plane.

The invention claimed is:

1. A tensioning rail for an endless drive, in particular a timing chain drive of an internal combustion engine, comprising:
    a sliding lining body and a reinforcement body inserted in said sliding lining body and connected thereto by means of a detent connection, said sliding lining body comprising a slide rail for contact with an endless drive means and a press-on region for the tensioning piston of a tensioning device,
    wherein the whole press-on region is arranged in a resiliently movable fashion on the slide rail and comprises a detent device as a constituent part of the detent connection such that the detent device is adapted to be locked due to the resilient movement of the whole press-on region.

2. The tensioning rail according to claim 1, wherein the press-on region includes a resiliently movable middle portion after the fashion of a bridge, said middle portion having the detent device arranged thereon.

3. The tensioning rail according to claim 2, wherein the press-on region comprises first and second portions fixedly connected to the rest of the sliding lining body, and the intermediate, resiliently movable middle portion connected to the rest of the sliding lining body only by means of said first and second portions.

4. The tensioning rail according to claim 3, wherein an insertion channel and the detent device are provided below the middle portion of the press-on region, the reinforcement body being inserted in said insertion channel and locked with said detent device.

5. The tensioning rail according to claim 1, wherein the detent device on the press-on region is a protruding detent projection, which is in locking engagement with an adapted undercut on the reinforcement body.

6. The tensioning rail according to claim 1, wherein the middle portion of the press-on region has downwardly projecting side elements arranged laterally on the reinforcement body.

7. The tensioning rail according to claim 1, wherein the sliding lining body is made of plastic material and that the reinforcement body is made of metal, preferably of steel.

8. The tensioning rail according to claim 1, wherein the sliding lining body including the press-on region and the detent device is an integrally formed plastic component.

9. The tensioning rail comprising a pivot opening according to claim 1, wherein the pivot opening is defined by the reinforcement body.

10. The tensioning rail according to claim 9, wherein, below the pivot opening, block supports are provided on the sliding lining body on both sides thereof, said block supports defining between them an accommodation groove having the reinforcement body arranged therein.

11. The tensioning rail according to claim 9, wherein the reinforcement body has an extension on its end located close to the pivot opening, said extension being in locking engagement with the sliding lining body through an additional detent connection.

12. The tensioning rail according to claim 9, wherein the reinforcement body defines an insertion end on an end located remote from the pivot opening, said insertion end being inserted in an accommodation pocket on the sliding lining body.

13. The tensioning rail according to claim 1, wherein the press-on region is resiliently configured such that it provides a locking movement of at least 1 mm for the detent device.

14. An endless drive, in particular a timing chain drive of an internal combustion engine, comprising a drive gear, at least one driven gear, an endless drive means, such as a chain or a belt, coupling the drive gear and the at least one driven gear, and a tensioning rail according to claim 1, tensioning the endless drive means.

* * * * *